United States Patent [19]

Hill et al.

[11] Patent Number: 4,958,277
[45] Date of Patent: Sep. 18, 1990

[54] QUEUED SERIAL PERIPHERAL INTERFACE FOR USE IN A DATA PROCESSING SYSTEM

[75] Inventors: Susan C. Hill; Joseph Jelemensky; Mark R. Heene, all of Austin; Stanley E. Groves, Round Rock, all of Tex.; Daniel N. DeBrito, Carmel, Ind.

[73] Assignee: Motorola, Inc., Schaumburg, Ill.

[21] Appl. No.: 342,651

[22] Filed: Apr. 21, 1989

Related U.S. Application Data

[63] Continuation of Ser. No. 77,469, Jul. 24, 1987, abandoned.

[51] Int. Cl.$^5$ .................. G06F 3/00; G06F 13/00; G06F 13/12
[52] U.S. Cl. .................. 364/200; 364/238.3; 364/239; 364/239.2; 364/239.7; 364/241.9; 364/244; 364/244.3; 364/245.5; 364/245.6; 364/254; 364/254.5; 364/260; 364/260.1; 364/284; 364/284.2; 364/284.1
[58] Field of Search .................. 364/200, 900, 300

[56] References Cited

U.S. PATENT DOCUMENTS

| 4,410,942 | 10/1983 | Milligan et al. | 364/200 |
|---|---|---|---|
| 4,423,486 | 12/1983 | Bauer et al. | 364/200 |
| 4,435,762 | 3/1984 | Milligan et al. | 364/200 |
| 4,471,457 | 9/1984 | Videki, II | 364/900 |
| 4,488,226 | 12/1984 | Wagner, Jr. et al. | 364/200 |
| 4,609,995 | 9/1986 | Hasebe | 364/900 |
| 4,615,001 | 9/1986 | Hudgins, Jr. | 364/200 |
| 4,641,276 | 2/1987 | Dunki-Jacobs | 364/900 |
| 4,675,812 | 6/1987 | Capowski et al. | 364/200 |
| 4,682,304 | 7/1987 | Tierney | 364/900 |
| 4,683,530 | 7/1987 | Quatse | 364/200 |
| 4,692,859 | 9/1987 | Ott | 364/200 |
| 4,719,593 | 1/1988 | Threewitt et al. | 364/900 |
| 4,727,477 | 2/1988 | Gavril | 364/200 |
| 4,733,366 | 3/1988 | Deyesso et al. | 364/900 |
| 4,750,109 | 6/1988 | Kita | 364/200 |
| 4,816,996 | 3/1989 | Hill et al. | 364/200 |

Primary Examiner—David Y. Eng
Assistant Examiner—Robert B. Harrell
Attorney, Agent, or Firm—Jonathan P. Meyer

[57] ABSTRACT

A serial peripheral interface achieves compatibility with devices having previous such interfaces while significantly reducing the amount of intervention required on the part of the controlling data processing device. Many serial transfers are written to a memory by the controlling device together with command and control information. The interface then executes the stored, or queued, transfers autonomously. Features such as programmable transfer length, programmable chip selects, an alterable queue pointer, and others contribute to the flexibility and usefulness of the interface.

18 Claims, 7 Drawing Sheets

| ADDRESS 15 | | 8 | 7 | 0 |
|---|---|---|---|---|
| 0 0001 010X | RESERVED | | QDDR | |
| 0 0001 011X | RESERVED | | QDDR | |
| 0 0001 100X | SPCR0 | | | |
| 0 0001 101X | SPCR1 | | | |
| 0 0001 110X | SPCR2 | | | |
| 0 0001 111X | SPCR3 | | SPSR | |
| | NOT IMPLEMENTED | | | |
| 1 000X XXXX | QSPI RECEIVE DATA | | | |
| 1 001X XXXX | QSPI TRANSMIT DATA | | | |
| 1 0100 XXXX | QSPI COMMAND CONTROL | | | |

QSPI RAM

*FIG. 4A*

```
 15   1413      10 9   8 7                       0
|MSTR|WOM| BITS |CPOL|CPHA|        BAUD          |
                    SPCR0

15   14                 8 7                     0
|SPE |    DSCKL          |         DTL           |
                    SPCR1

15    14   13  12  11      8 7    4 3           0
|SPIFIE|WRAP|NOT IMPL.| ENDQP |NOT IMPL.| NEWQP  |
                    SPCR2
```

QUEUED SERIAL PERIPHERAL INTERFACE FOR USE IN A DATA PROCESSING SYSTEM

This application is a continuation of prior application Ser. No. 07/077,469, now abandoned, filed July 24, 1987.

RELATED APPLICATIONS

This application for patent is related to a co-pending application bearing Ser. No. 077,578 now U.S. Pat. No. 4,816,996.

FIELD OF THE INVENTION

The present invention relates, in general, to a serial interface for data communications between components of a data processing system. More particularly, the invention relates to a queued serial interface which provides relatively more autonomous operation as compared to prior art serial interfaces.

BACKGROUND OF THE INVENTION

Serial interfaces for data communications between components of data processing systems are numerous. One fairly typical such interface definition is referred to as the SPI (Serial Peripheral Interface) and is incorporated in many microcomputers and peripherals designed by Motorola, Inc. of Austin, Texas.

Figure 1:
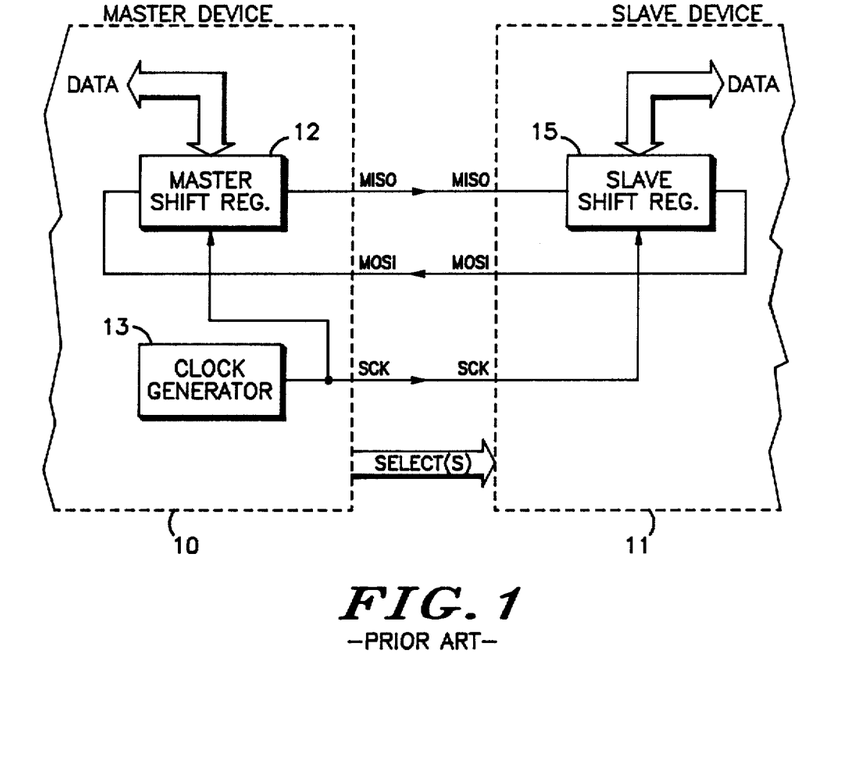
FIG. 1 is a block diagram illustrating the features and principles of a prior art SPI interface.

FIG. 1 illustrates the SPI, which may be characterized as a synchronous, three-wire serial interface. A master device 10, such as a microcomputer (MCU), and a slave device 11, such as an analog-to-digital converter or similar peripheral, communicate by means of their respective SPI interfaces. In master device 10, the SPI apparatus comprises a master shift register 12 and a clock generator 13. The least significant bit of shift register 12 has an input connected to a pin labeled MISO (master in/slave out) and the most significant bit of shift register 12 has an output connected to a pin labeled MOSI (master out/slave in). The output of clock generator 13 is connected to the clock input of shift register 12 and to a pin labeled SCK (for S clock).

The SPI apparatus of slave device 11 (there may, of course, be more than one slave device coupled to a single master) comprises a slave shift register 15. A least significant bit of shift register 15 has an input connected to a pin labeled MOSI and a most significant bit of shift register 15 has an output connected to a pin labeled MISO. The clock input of shift register 15 is connected to a pin labeled SCK.

The respective MOSI, MISO and SCK pins of master device 10 and slave device 11 are connected to one another. In addition, one or more chip select signals of master device 10 are connected to enable inputs of slave device 11. Both master device 10 and slave device 11 have a data path for entering data to be transmitted into and retrieving received data from their respective shift registers. In addition, both typically have status register bits for indicating the current status of the interface and control register bits for configuring the interface.

The primary drawback of the SPI interface as described above is that it requires a relatively high degree of intervention from the controller of the master device (typically the central processing unit (CPU) of an MCU), which is often subject to servicing demands from many different sub-systems in addition to the SPI interface. A single data transfer is limited to the number of bits which can be held in the SPI shift register, typically 8. Every time a data transfer is to be commenced, the CPU must write the byte to be transferred to the shift register and assert a control bit to commence the serial transfer (or, equivalently, assert the control bit then read the received byte when the transfer is complete). Typically, when a serial transfer is complete, the SPI interrupts the CPU to demand further service, for instance, the loading of a new byte of data for transmission. Alternatively the CPU may continually poll the SPI to determine if service is required. In either case, the required CPU intervention for each byte transferred is substantial and the frequency with which the CPU must dedicate its resources to servicing the SPI is high.

SUMMARY OF THE INVENTION

Accordingly, it is an object of the present invention to provide an improved serial peripheral interface for use in data processing systems.

Another object of the present invention is to provide a serial peripheral interface for use in data processing systems which requires less intervention from the master controller to accomplish a given data transfer.

Yet another object of the present invention is to provide a queued serial peripheral interface for use in data processing systems.

These and other objects and advantages of the present invention are provided by a serial peripheral interface apparatus comprising means for executing serial transfers, memory means for storing a plurality of serial transfers, each of said serial transfers comprising received data, data to be transmitted and command control data, register means for storing control information, queue pointer means for indicating one of said plurality of stored serial transfers, and control means for executing each of said stored serial transfers in accordance with said command control data and said control information, for altering said queue pointer means and for indicating when each of said stored serial transfers has been executed. The queue pointer means is capable of being altered by an external controlling device, the apparatus is capable of continuously executing multiple transfers to a particular destination, control means may be directed to continuously execute some or all of the stored transfers without stopping and the number of stored transfers to be executed before terminating may be altered.

DETAILED DESCRIPTION OF THE INVENTION

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false. In some instances, in order to accommodate standard usage, "set" or "setting" may be used in the place of "assert" or "assertion" and "clear" or "clearing" may be used in the place of "negate" or "negation".

Figure 2:
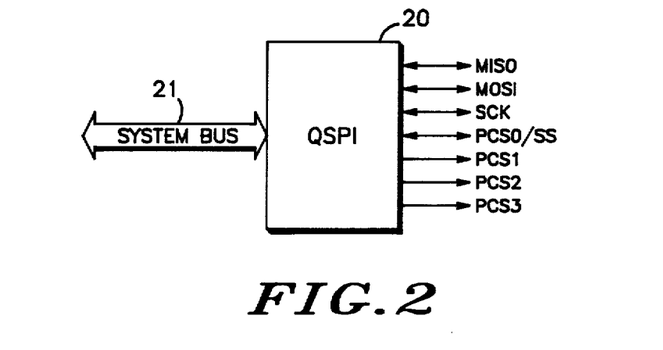
FIG. 2 is a block diagram illustrating the interconnections to and from a queued serial peripheral interface according to the principles of the present invention.

FIG. 2 is a diagram of a queued serial peripheral interface unit (QSPI) 20 according to a preferred embodiment of the present invention. QSPI 20 is intended for use as one component of an integrated circuit MCU, but may also be used as a stand-alone serial interface or in other embodiments. QSPI 20 communicates with other components of the MCU, including the CPU thereof, via an internal system bus 21. Seven pins of the MCU are available for use by QSPI 20. They are: MISO, MOSI and SCK, which correspond to the similarly labeled pins described with reference to FIG. 1, and PCS0/SS, PCS1, PCS2 and PCS3, which are programmable chip select pins. PCS0/SS is used as an input select pin when QSPI 20 is operated in its slave mode, as will be made more clear by the further description below.

Figure 3:
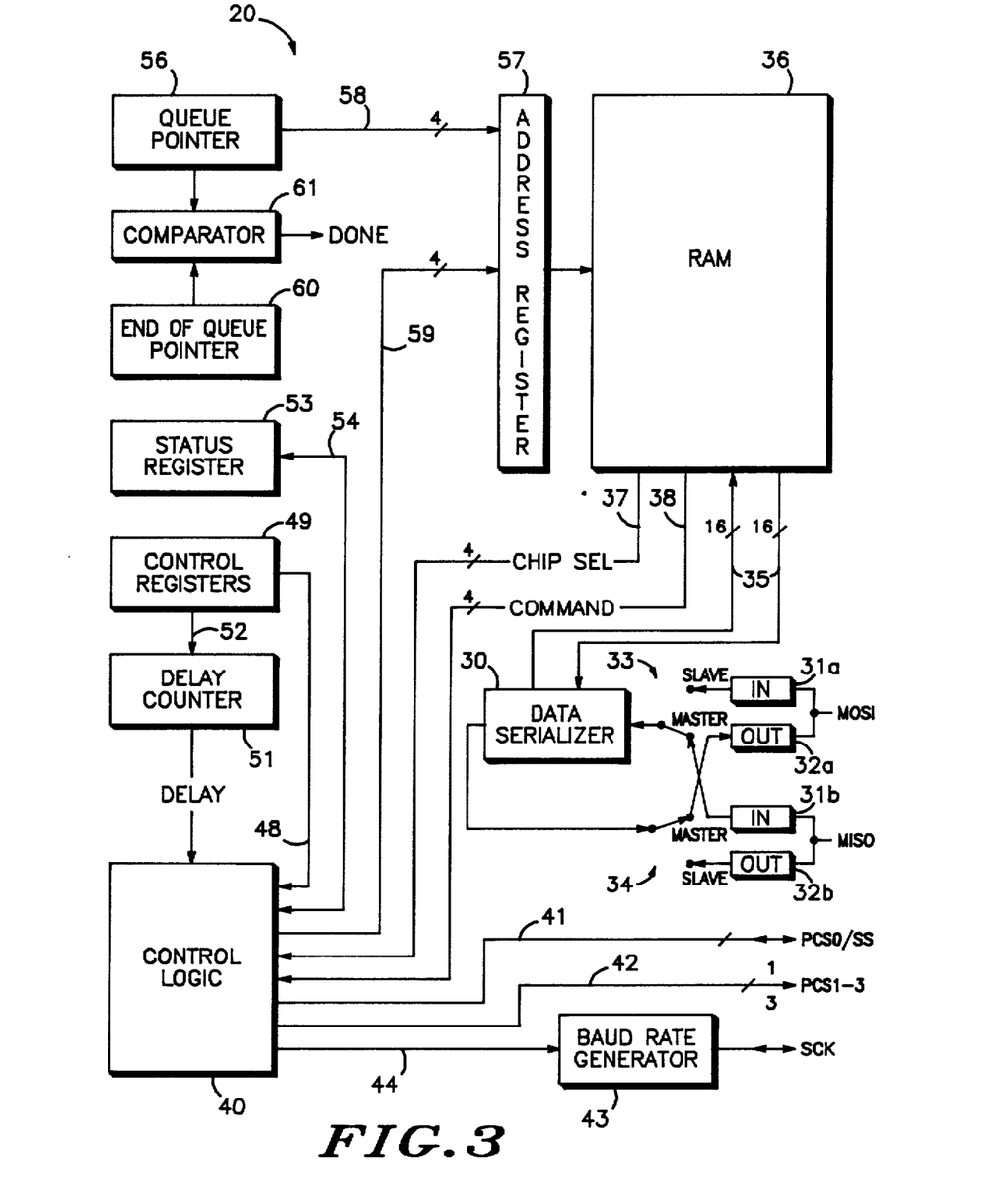
FIG. 3 is a block diagram illustrating the major components of a queued serial peripheral interface according to the principles of the present invention.

FIG. 3 is a block diagram illustrating the major functional components of the QSPI illustrated in FIG. 2. The apparatus illustrated is somewhat simplified for purposes of clarity. A data serializer 30, a pair of input buffers 31a and 31b, a pair of output buffers 32a and 32b, a first switch 33 and a second switch 34 provide functions analogous to master shift register 12 (FIG. 1). The MOSI pin is coupled to input buffer 31a and to output buffer 32a, while the MISO pin is coupled to input buffer 31b and to output buffer 32b. When QSPI 20 is in a master mode, switch 33 couples input buffer 31b to the least significant bit of data serializer 30 and switch 34 couples the most significant bit of data serializer 30 to output buffer 32a. In slave mode, switch 33 couples input buffer 31a to the least significant bit of data serializer 30 and switch 34 couples the most significant bit of serializer 30 to output buffer 32b.

Data serializer 30 may be characterized as a combination shift register and multiplexor. As will be made more clear below, QSPI 20 is capable of variable length transfers of data. Therefore, the output of serializer 30 (the most significant bit) must be variable. In the preferred embodiment, QSPI is capable of transferring from 8 to 16 bits, inclusive. Thus, the most significant bit output of serializer 30 varies from bit 7 to bit 16, inclusive. The least significant bit input to serializer 30 is always bit 0. The multiplexor function of data serializer 30 is used to ensure that the most significant bit output is coupled to the appropriate bit of the shift register for each possible transfer length. Data is always read from and written to data serializer 30 in right justified form.

A bidirectional data path 35 couples data serializer 30 to a QSPI Random Access Memory (RAM) 36. As will be made more clear below, QSPI RAM 36 serves to store data to be transferred from QSPI 20 to other devices, data transferred from such other devices to QSPI 20 and command control information necessary to specify the length, destination and other parameters associated with each transfer. The command control portion of the information stored in QSPI RAM 36 is supplied via data paths 37 and 38 to a block of control logic 40.

Control logic 40 is coupled via a bidirectional path data path 41 to the PCS0/SS pin of QSPI 20 and via a unidirectional data path 42 to the PCS1-PCS3 pins thereof. Thus, control logic 40 controls the assertion of the peripheral chip select signals for each transfer. The information necessary to determine the appropriate chip selects is provided to control logic 40 from QSPI RAM 36. Control logic 40 is coupled to a baud rate generator 43 via a data path 44. In the master mode baud rate generator 43 receives control information from control logic 40 which determines the frequency of the clock signal (referred to as the baud rate) to be supplied via the SCK pin to control the timing of transfers in the manner described above with respect to FIG. 1. In the slave mode the baud rate is supplied externally via the SCK pin. Baud rate generator is coupled to the SCK pin of QSPI 20.

The information necessary for control logic 40 to determine the baud rate is not received from QSPI RAM 36. Rather, this and other control information is received via data path 48 from one of a bank of control registers 49. As will be made more clear below, control registers 49 also contain other information necessary to configure and control QSPI 20. Thus, it is apparent that there exist two types of control information with regard to this apparatus: that which is stored in QSPI RAM 36 and that which is stored in control registers 49. This distinction is further described below.

One of the other items of control information contained in control registers 49 specifies a delay to be inserted in the execution of transfers at specified points. This delay information is supplied to a delay counter 51 via a data path 52. An output of delay counter 51 is coupled to control logic 40.

A status register 53 contains information regarding the current state of QSPI 20 and is coupled to control logic 40 via a bidirectional data path 54.

A queue pointer register 56 contains data bits which designate the location(s) in QSPI RAM 36 which contains the information specifying the currently executing transfer. These data bits are provided to an address register 57 via a data path 58. Control logic 40 also is coupled to address register 57 via a data path 59. Address register 57 provides addresses to QSPI RAM 36.

An end of queue pointer register 60 contains a predetermined queue pointer value which is used to signal the end of the list of queued transfers. Both queue pointer register 56 and end of queue pointer register 60 are coupled to a comparator 61 which compares the values and signals when the list of queued transfers has been completed. As will be described more fully below, both queue pointer register 56 and last queue pointer register 60 are, in a preferred embodiment of the present invention, implemented as part of control registers 49.

FIG. 3, for purposes of clarity, does not include certain details which would be required in an actual QSPI system. Most notably, the data and address paths by which a controlling device such as a CPU would control the operation of QSPI 20 are not shown. These will be apparent from the further description below. In general, there are many possible ways to implement the logical functions of QSPI 20 in hardware and FIG. 3 is intended for purposes of illustration only.

Figure 4A:
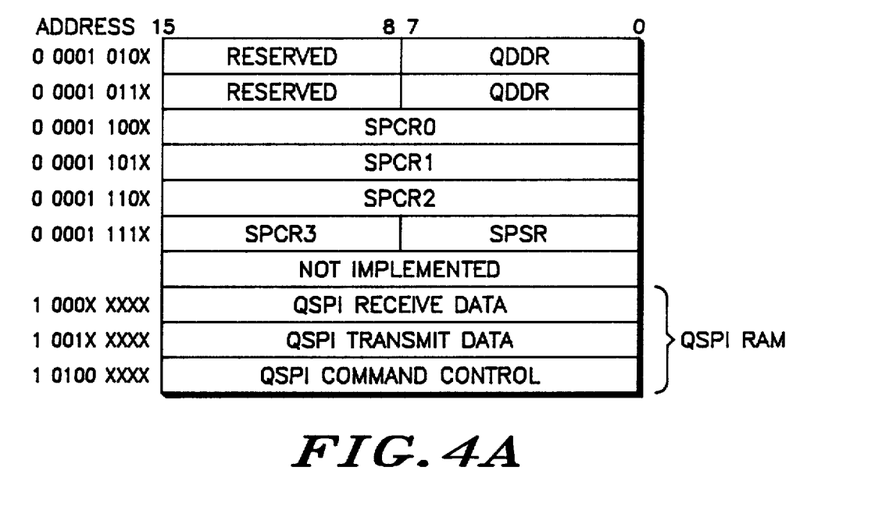
FIG. 4A is a diagram illustrating the memory map of the interface of FIG. 3.

FIG. 4A is a diagram illustrating the memory map of QSPI 20 as it appears to a controlling device such as a CPU communicating over system bus 21 (FIG. 2). While the particular embodiment includes an address 24 bits wide, only the lower nine bits are necessary to illustrate that portion of the address space occupied by QSPI 20. As illustrated, the memory system is physically organized as words addressable as bytes, words or long words.

The byte located at address 000010100 comprises a register QPDR (Port Data Register) and the byte located at address 000010110 comprises a register QDDR (Data Direction Register). The seven pins associated with QSPI 20 (see FIG. 2), when not being used by QSPI 20 may be used as general purpose I/0 pins. The QPDR and QDDR registers are used according to standard practice within the Motorola family of microprocessor products to control this use of these pins. Except as mentioned below with respect to pin definitions, the details of the use of registers QPDR and QDDR are not necessary to an understanding of the present invention.

The word located at address 000011000 comprises a register SPCR0 (Control Register 0). Similarly, the words located at addresses 000011010 and 000011100 comprise registers SPCR1 and SPCR2, respectively. The byte located at address 000011110 comprises a register SPCR3. Together, the registers SPCR0-SPCR3 comprise the control registers for QSPI 20.

The byte located at address 000011111 comprises a register SPSR (Status Register). This register comprises the status register for QSPI 20.

The remainder of the memory map illustrated in FIG. 4A comprises QSPI RAM 36 (see FIG. 3). This area of RAM is broken into three segments: QSPI Receive Data, QSPI Transmit Data and QSPI Command Control. QSPI Receive Data comprises the sixteen words beginning at address 10000000 and ending at address 100011110. QSPI Transmit Data comprises the sixteen words starting at address 100100000 and ending at address 100111110. QSPI Command Control comprises the sixteen bytes starting at address 101000000 and ending at address 101001111. One word of the Transmit Data section, one word of the Receive Data section and one byte of the Command Control section together form one transfer, thus making for a maximum queue length in the preferred embodiment of sixteen transfers. As is apparent, this could easily be extended to any reasonable number of possible transfers requiring only the addition of more space for QSPI RAM 36.

As will be explained more completely below, the queue pointer forms the basis for a set of three addresses which simultaneously "point to" one word in QSPI Receive Data, one word in QSPI Transmit Data and one byte in QSPI Command Control. Thus, a single queue pointer provides information relating to where to find the information to be transmitted, where to store the information received and where to find the command control information necessary to complete the transfer. This provides much of the autonomy of QSPI 20 as compared to the prior art SPI, since once the data to be transmitted and the command control information has been written into QSPI RAM and the control registers have been properly initialized, QSPI 20 can execute the programmed transfers automatically simply by incrementing the queue pointer without further intervention from an outside controller.

Several miscellaneous features of the QSPI RAM which are implemented in the preferred embodiment of the present invention bear mention at this point. Both the Transmit Data and Receive Data section must contain data in right justified form. For instance, if a particular transfer involves the transmitting of a single byte rather than an entire word, the controlling CPU must write the byte to be transferred to the appropriate address in QSPI RAM in right justified form and the upper byte of that word cannot be used for other data to be transmitted. Once data to be transmitted has been written to the QSPI RAM it can be transmitted as often as desired without further writes to QSPI RAM. Thus, the same data may be repeatedly transferred to a particular slave unit or may be transmitted to several different slave units merely by changing the appropriate bits in the Command Control section to designate the different destinations. Neither the Transmit Data section nor the Command Control section of the QSPI RAM are written to by the QSPI itself during normal operation.

Figure 4B:
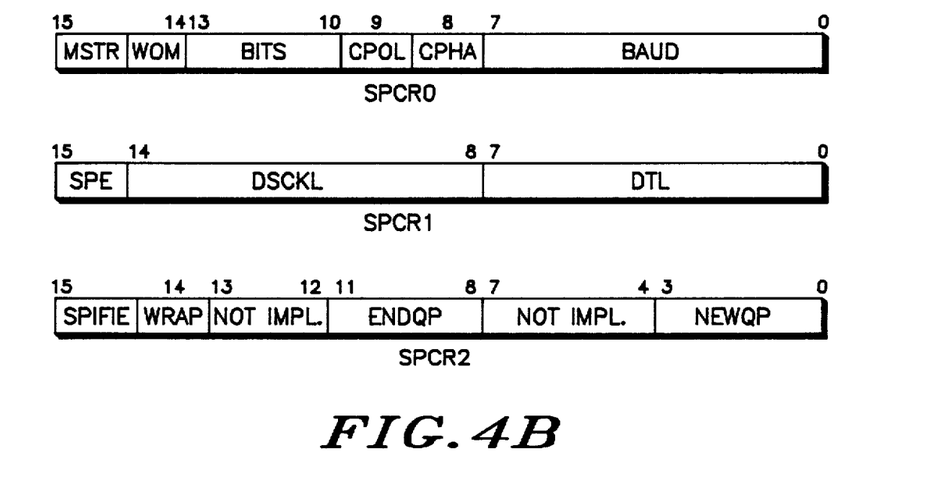
FIG. 4B is a diagram illustrating the format of three control registers of FIG. 4A.

FIG. 4B illustrates the details of the allocation of space within control registers SPCR0–SCPR2 to the various required control functions. These registers (and control register SPCR3, illustrated in FIG. 4C) are read/write registers which are set to predetermined values when QSPI 20 is reset and which can be modified by the CPU or other master controlling system bus 21. In general, writes to these registers which change their values should be avoided while QSPI 20 is enabled, as uncertain results may result. However, register SPCR2 is implemented in the preferred embodiment so as to produce predetermined results when altered during operation of QSPI 20. This is discussed further below.

Bits 0-7 of SPCR0, labeled BAUD, are used to determine the baud rate, or clock frequency, of SCK. In decimal representation, the value of BAUD is in the range of 0 to 255, but the values 0, 1 and 2 (decimal) are illegal and will disable the SCK generator. The baud rate of SCK is determined by dividing the system clock rate (the frequency of the clock off which QSPI 20 runs) by the value in BAUD (in decimal) plus one. Thus, the highest possible baud rate for SCK is one-fourth of the system clock rate. Of course, this particular relationship between the system clock, the value of BAUD and the baud rate is merely exemplary of the particular embodiment being described and is subject to many modifications.

Bit 8 of SPCRO, labeled CPHA, is used to determine upon which edge of SCK data will be allowed to change and upon which edge data will be captured. If CPHA is asserted, data changes on the leading edge of SCK and is captured on the trailing edge of SCK. If CPHA is negated, data changes on the trailing edge of SCK and is captured on the leading edge of SCK.

Bit 9 of SPCR0, labeled CPOL, is used to determine the polarity of SCK. If CPOL is asserted, the steady state value of SCK (i.e., no transfer taking place) is logic high. If CPOL is negated, the steady state of SCK is logic low. CPHA and CPOL must be properly initialized to set up the desired clock polarity and data capture relationship between the master and slave devices.

Bits 10-13 of SPCR0, labeled BITS, determine the number of bits transferred by QSPI 20 in each transfer executed. The value in BITS is used only for those transfers which have the BITSE control bit (bit 6 of the Command Control byte, see FIG. 5) asserted. For those transfers for which BITSE is not asserted, eight bits are transferred (the lower eight bits of the word in the Transmit Data section of QSPI RAM which is pointed to by the current queue pointer). For those transfers having BITSE asserted, the number of bits transferred is determined in accordance with the table below.

| BIT 7 | BIT 6 | BIT 5 | BIT 4 | BITS TRANSFERRED |
|---|---|---|---|---|
| 0 | 0 | 0 | 0 | 16 |
| 0 | 0 | 0 | 1 | RESERVED |
| 0 | 0 | 1 | 0 | RESERVED |
| 0 | 0 | 1 | 1 | RESERVED |
| 0 | 1 | 0 | 0 | RESERVED |
| 0 | 1 | 0 | 1 | RESERVED |
| 0 | 1 | 1 | 0 | RESERVED |
| 0 | 1 | 1 | 1 | RESERVED |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

In each case, the bits transferred are the least significant bits of the word in the Transmit Data section for that transfer and the received data is placed in the least significant portion of the appropriate word in the Receive Data section. Even if only the lower half of a particular word in the Transmit Data section, for instance, is used for a particular transfer, the upper half of that word may not be used for another transfer. Each transfer has allocated one entire word in the Transmit Data section, one entire word in the Receive Data section and one entire byte in the Command Control section of the QSPI RAM, regardless of the programmed length of the transfer.

Data serializer 30 (see FIG. 3) is required to account for the variability of the number of bits for each transfer by behaving as a variable length shift register. A number of possible logical implementations of such a function are possible. In a transfer of eight bits to a peripheral only capable of receiving eight bits at a time (i.e., having an eight bit SPI shift register), for instance, it is necessary that the transfer be stopped after eight bits are transferred to avoid overwriting the initially transferred data in the destination shift register. A possible implementation of this is to load a counter with the number of bits to be transferred, decrement the counter each time one bit is transferred and stop the transfer when the counter reaches zero.

Bit 14 of SPCR0, labeled WOM, is used to indicate whether the outputs can be wire-ORed. If the WOM bit is asserted, all pins designated as outputs by QDDR and used as outputs by QSPI 20 will function as open-drain outputs and can be wire-ORed to external lines Otherwise, the designated output pins will not act as open-drain outputs and cannot be wire-ORed. This is the normal state of the pins.

Bit 15 of SPCR0, labeled MSTR, determines whether QSPI 20 is configured as a master or a slave. When the MSTR bit is asserted QSPI 20 is a master and when the MSTR bit is negated QSPI 20 is a slave. An important aspect of the master/slave mode configuration is the input/output configuration of each pin of QSPI 20 and the interaction with the configuration specified by QDDR. In the master mode, MISO should be configured as an input and MOSI, SCK, PCSO/SS and PCS1-PCS3 should all be configured as outputs. In the slave mode, MISO should be configured as an output, MOSI, SCK and PCSO/SS should be configured as inputs and PCS1-PCS3 are not used. However, in the preferred embodiment in which the QSPI pins may be used as general I/0 pins when not in use by QSPI 20 and in which the value in QDDR specifies the input/output configuration of each pin, it is possible that some pins may be mis-configured if an inappropriate value is left in QDDR when QSPI 20 is enabled. This may be avoided simply by properly initializing QDDR along with the other control registers prior to enabling QSPI 20.

Bits 0-7 of SPCR1, labeled DTL, are used to specify a delay to be inserted after each serial transfer for which DT (bit 5 of the Command Control byte, see FIG. 5) is asserted. In the preferred embodiment, for DTL values in the range of 1 to 255 (decimal), the delay period is calculated by multiplying the DTL value by 32, then dividing by the system clock rate. If DTL is zero, the delay is 8192 divided by the system clock rate. If DT is negated for a particular transfer, no delay is inserted regardless of the value of DTL.

Bits 8-14 of SPCR1, labeled DSCKL, are used to determine the length of the minimum delay between the assertion of the chip select pins to the first SCK transition for any transfers for which DSCK (bit 4 of the Command Control word, see FIG. 5) is asserted. For transfers which have DSCK negated, the timing is approximately one-quarter SCK period if CPHA is negated and approximately one-quarter SCK period if CPHA is asserted. In the preferred embodiment, when DSCK is asserted, the minimum delay is calculated by dividing the value of DSCKL (in decimal) by the system clock rate, except when DSCKL is 0, in which case the delay is 128 divided by the system clock rate. The delay provided by DSCKL and DSCK is useful to accommodate the varying set up times required by existing peripherals with SPI interfaces.

Bit 15 of SPCR1, labeled SPE, is used to enable and disable QSPI 20. If SPE is negated, QSPI 20 is disabled and its pins may be used for general purpose I/0. When SPE is asserted, if MSTR is asserted, QSPI 20 will immediately begin executing the queued transfers. If MSTR is negated when SPE is asserted, QSPI 20 will begin monitoring PCSO/SS in order to respond to the initiation of a serial transfer from a master.

Care must be taken when negating SPE, since such action in the midst of a serial transfer will cause loss of data. If either the SPIF or HALTA flags of SPSR (see FIG. 4C) are in an asserted state, then QSPI 20 is prepared to be disabled and SPE may be safely negated, assuming that WRAP is not set.

Bits 0-3 of SPCR2, labeled NEWQP, is used to hold a new value of the queue pointer. The controlling CPU can write a value to NEWQP to force QSPI 20 to change the queue pointer to this new value after completing the currently executing transfer. Normally, the queue pointer is simply incremented after each transfer to point to the immediately following transfer. In fact, the value actually used by QSPI 20 as the queue pointer resides in an incrementor which is not apparent to the user.

When a value is written to NEWQP, a flag which is not apparent to the user is set. This flag is checked by QSPI 20 just prior to the execution of each transfer. If the flag is set, the value in NEWQP is used to replace the value in the incrementor and execution is continued.

This feature provides very useful flexibility similar to the ability of a computer to execute and return from subroutines.

The value contained in NEWQP is also used when QSPI 20 is in the wraparound mode. When WRAP (bit 1 of SPCRO, see FIG. 4B) is asserted, the value in NEWQP is used to reset the queue pointer when it reaches the end of the queue.

Like all of the bit fields of SPCR2, the value of NEWQP may be changed while QSPI 20 is enabled (that is, while SPE is set) without incurring the risk of unpredictable results. This is accomplished by implementing all of SPCR2 with a buffer, or shadow register. Writes to SPCR2 immediately alter the appropriate values in the register, but QSPI 20 actually operates based on the values in the buffer, or shadow register. The buffer is periodically updated from the actual register at predetermined times when no upset will occur on account of the changes.

Bits 4-7 of SPCR2 are not implemented, thus allowing for expansion of the queue length and the required increased length of NEWQP.

Bits 8-11 of SPCR2, labeled ENDQP, specify the value of the queue pointer which corresponds to the point at which the execution of the current queued list of transfers should be stopped. The value to which the queue pointer is internally reset, corresponding to the first transfer in the queue, is 0000, so the default value of ENDQP is 0000. The correspondence between the value if ENDQP and the number of transfers in the queue is set forth in the table below.

| BIT 13 | BIT 12 | BIT 11 | BIT 10 | LAST QUEUE LOCATION TRANSFERRED |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

Bits 12-13 of SPCR2 are not implemented, leaving room for expansion of ENDQP due to expansion of the queue. Note that, because ENDQP is located in the buffered register SPCR2, its value may be changed while SPE is set without the danger of upsetting the operation of QSPI 20.

Bit 14 of SPCR2, labeled WRAP, is used to cause QSPI 20 to continuously execute its list of queued transfers without stopping, simply by resetting the queue pointer to some predetermined value when it completes the last item in the list. The value to which the queue pointer is reset may be, for instance, either the top of the queue (0000) or the value contained in NEWQP. If WRAP is asserted, QSPI 20 will continue to loop through the queue until WRAP is negated, HALT is asserted or QSPI is disabled. Otherwise, QSPI 20 disables itself when it reaches the end of the queue. WRAP is, like all of SPCR2, implemented with a shadow bit.

Bit 15 of SPCR2, labeled SPIFIE, is used to enable QSPI 20 to generate interrupt requests to the controlling CPU whenever the SPIF status flag (bit 7 of SPSR, see FIG. 4C) is asserted. If SPIFIE is asserted, the assertion of SPIF will cause the generation of an interrupt request; otherwise, no interrupts will be generated when SPIF is asserted.

Figure 4C:
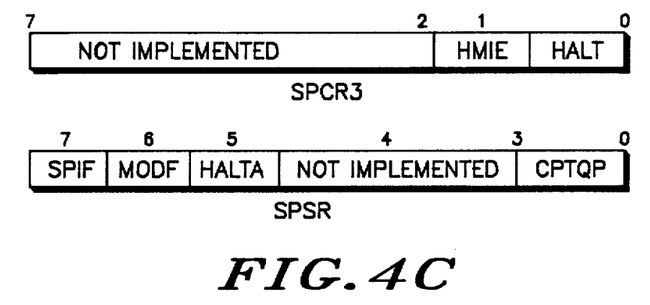
FIG. 4C is a diagram illustrating the formats of a control register and a status register of FIG. 4A.

Referring now to FIG. 4C, the allocation of the word in the memory map at address 00011110 is described. Byte 00011110 is allocated to the fourth control register, SPCR3 and byte 00011111 is allocated to the status register SPSR.

Bit 0 of SPCR3, labeled HALT, allows the unit controlling QSPI 20 to stop the operation of QSPI 20 in the midst of a queue of transfers, place QSPI 20 into a known state and restart QSPI 20 when desired When HALT is asserted, QSPI 20 will complete the currently executing transfer, then stop. If the CONT bit (bit 7 of each Command Control byte, see FIG. 5) for the currently executing transfer is set, the peripheral chip select pins will continue to be driven to the values specified for that transfer; otherwise, the peripheral chip select bits will be driven to their inactive states while HALT is asserted.

Bit 1 of SPCR3, labeled HMIE, is used to enable the generation of interrupt requests to the controlling CPU based on the assertion of either the HALTA flag (bit 5 of SPSR, see FIG. 4C) or the MODF flag (bit 6 of SPSR, see FIG. 4C). If HMIE is asserted, the assertion of either HALTA or MODF will cause the generation of an interrupt request; otherwise, assertion of HALTA or MODF will not cause the generation of an interrupt request.

In the preferred embodiment, QSPI 20 is capable of generating only a single, nonspecific interrupt request (that is, it has only a single interrupt vector). Thus, the interrupt handling routine for QSPI 20 must examine SPIF, HALTA and MODF to determine the cause of the interrupt.

Bits 2-7 of SPCR3 are not implemented.

The QSPI status register, SPSR, is used by QSPI 20 to contain various status flags which are readable and, in some cases, clearable by the controlling CPU. Bits 0-3 of SPSR, labeled CPTQP, contains a queue pointer value corresponding to the last transfer in the queue which has been completed. QSPI 20 updates the value of CPTQP immediately following the storing of the received data from a completed serial transfer into the Receive Data section of QSPI RAM 36. The controlling CPU may, for instance, store the value of CPTQP prior to writing a value to NEWQP. Thus, after executing the "subroutine" of transfers beginning at NEWQP, QSPI 20 could be restored to its previous condition through the use of the stored value of CPTQP. The controlling CPU cannot alter the value of CPTQP.

Bit 4 of SPSR is not implemented.

Bit 5 of SPSR, labeled HALTA, is asserted by QSPI 20 when it has come to an orderly halt in the normal course of its operation. This occurs when the controlling CPU asserts the HALT bit of SPCR3 and after QSPI has completed execution of the current transfer. If the HMIE bit of SPCR3 is asserted, QSPI 20 will also generate an interrupt request when HALTA is asserted. Once HALTA is asserted, it can be negated by the controlling CPU only after it has been read in its asserted state.

Bit 6 of SPSR, labeled MODF, is a flag used by QSPI 20 to indicate that there may have been a conflict between multiple masters for control of the SPI interface. QSPI 20 asserts MODF when the MSTR bit of SPCR0 is asserted (i.e., QSPI 20 is a master) and the pin PCS0/SS is asserted by some other device (which should only occur when QSPI 20 is a slave).

When MODF is asserted, an interrupt request will be generated if HMIE is asserted. Also, all pins used by QSPI 20 which are configured as outputs by their associated bits in QDDR are tri-stated until MODF is negated. The SPE bit in SPCR1 is cleared, thus disabling QSPI 20. Finally, the MSTR bit of SPCR0 is negated. Once MODF has been asserted, it can be negated by the controlling CPU only after it has been read in its asserted state.

Bit 7 of SPSR, labeled SPIF, is used by QPSI 20 to indicate that it has completed the list of queued transfers. This flag is asserted when the value of CPTQP, the pointer to the last completed transfer, matches the value of ENDQP, the pointer to the last transfer in the queue. Note that the SPIF flag is asserted regardless of whether the WRAP bit is asserted. Once the SPIF flag is asserted, if the SPIFIE bit is asserted, an interrupt request will be generated. Once asserted, the SPIF flag can be negated by the controlling CPU only after having been read in the asserted state.

Figure 5:
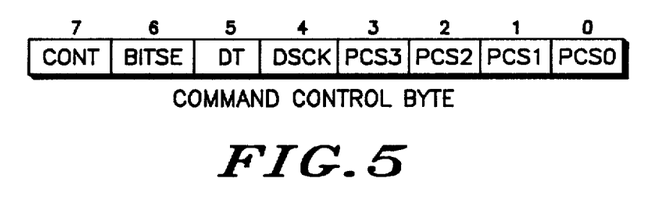
FIG. 5 is a diagram illustrating the format of the command control byte used in the interface of FIG. 3.

In general, all of the control bit fields discussed above with respect to control registers SPCR0-SPCR3 apply to all of the transfers in a queue. The registers are initialized prior to enabling QSPI 20 and, in general, not altered until the queue has finished executing or the QSPI is otherwise halted. In contrast, the control parameters represented by the bits of the Command Control byte, as illustrated in FIG. 5, are unique to each transfer in the queue. These parameters are a part of each transfer command and comprise the means by which the destination of each transfer and certain critical transfer parameters are established.

Bits 0-3 of the Command Control byte, labeled PCS0-PCS3, specify the logical states to be applied to the peripheral chip select pins PCS0-PCS3, respectively during each particular transfer. Since the peripherals to which QSPI 20 is intended to transfer data are intended to each respond to a particular pattern of chip select signals, the control bits PCS0-PCS3 determine the destination of each transfer. The values specified by PCS0-PCS3 are driven during each transfer. When no transfer is active, the value of the peripheral chip select pins is determined by the appropriate bits in QPDR.

Bit 4 of the Command Control byte, labeled DSCK, is used to determine whether the delay value specified in DSCKL will be inserted for each individual transfer. If DSCK is not asserted, no extra delay is inserted If DSCK is asserted, the delay specified by DSCKL is inserted.

Bit 5 of the Command Control byte, labeled DT, determines whether the delay specified in DTL will be inserted for each individual transfer. If DT is not asserted, no delay is inserted. If DT is asserted, the delay specified in DTL is inserted.

Bit 6 of the Command Control byte, labeled BITSE, cooperates with the BITS field of SPCR0 to determine the number of bits transferred in each particular transfer. If BITSE is not asserted, an eight bit transfer is executed. If BITSE is asserted, the length of the transfer is determined by the value of BITS, as described above.

Bit 7 of the Command Control byte, labeled CONT, is used to determine whether a continue mode will be used. If CONT is not asserted, the peripheral chip select pins are negated, or driven to their inactive states which are contained in the Port Data Register (QPDR), after the transfer is complete. If CONT is asserted, the peripheral chip select pins remain in their active states while the queue pointer is incremented to the next transfer. This feature is useful to provide for the uninterrupted transfer of more than sixteen bits to a particular peripheral.

One command control byte must be written to QSPI RAM for each transfer to be executed prior to enabling QSPI 20. Once written, the information is not changed until overwritten by the controlling CPU.

Figure 6:
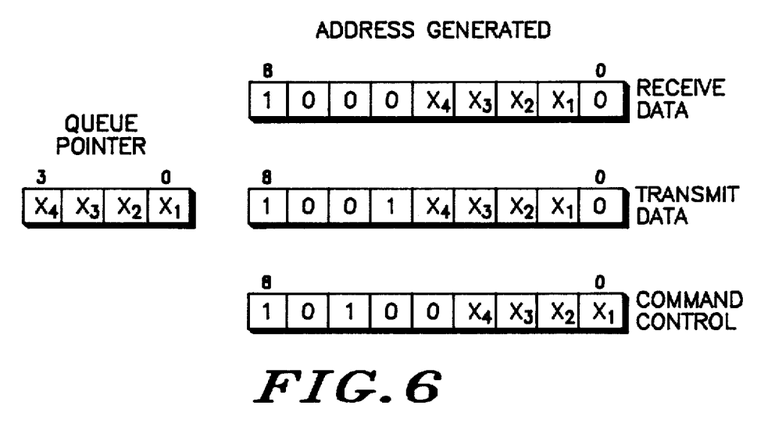
FIG. 6 is a diagram illustrating the queue pointer generation scheme used in the interface of FIG. 3.

Referring now to FIG. 6, the method of generating the addresses for the three sections of the QSPI RAM from the queue pointer is described. As discussed above, the actual queue pointer is a four bit field contained in an incrementor. In FIG. 6, this value is represented as $X_3X_2X_1X_0$. The address generated for each of the sections of QSPI RAM is a 9 bit address. In the case of the Receive Data Section, the upper four bits 1000, the next four bits are the queue pointer bits and the least significant bit is 0. In the case of the Transmit Data section, the upper four bits are 1001, the next four bits are the queue pointer bits and the least significant bit is 0. In the case of the Command Control section, the upper five bits are 10100 and the lower four bits are the queue pointer bits.

Figure 7A:
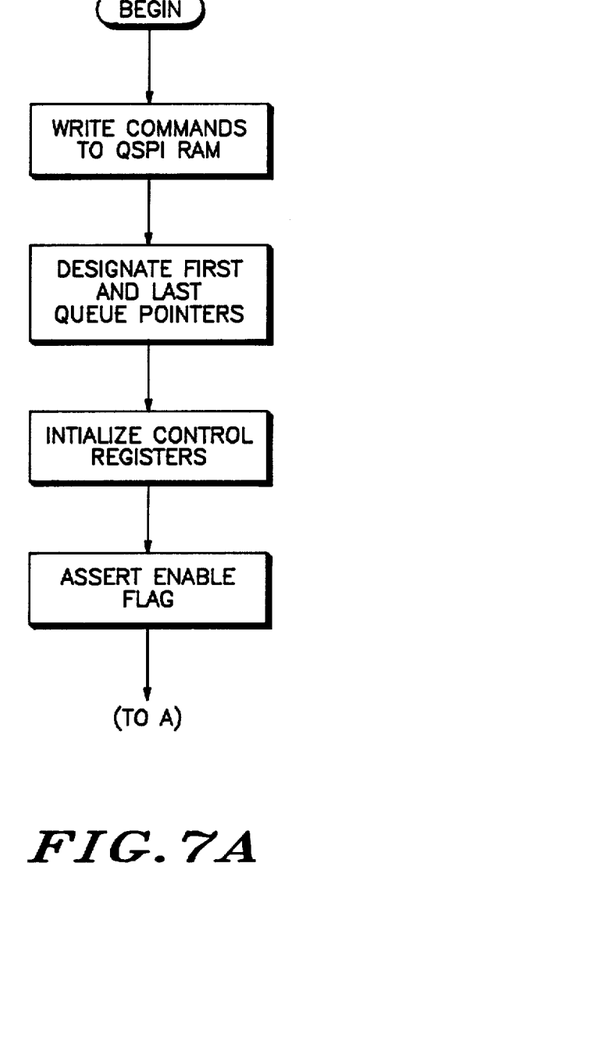
FIG. 7A is a flowchart illustrating a first portion of the operation of the interface of FIG. 3.
Figure 7B:
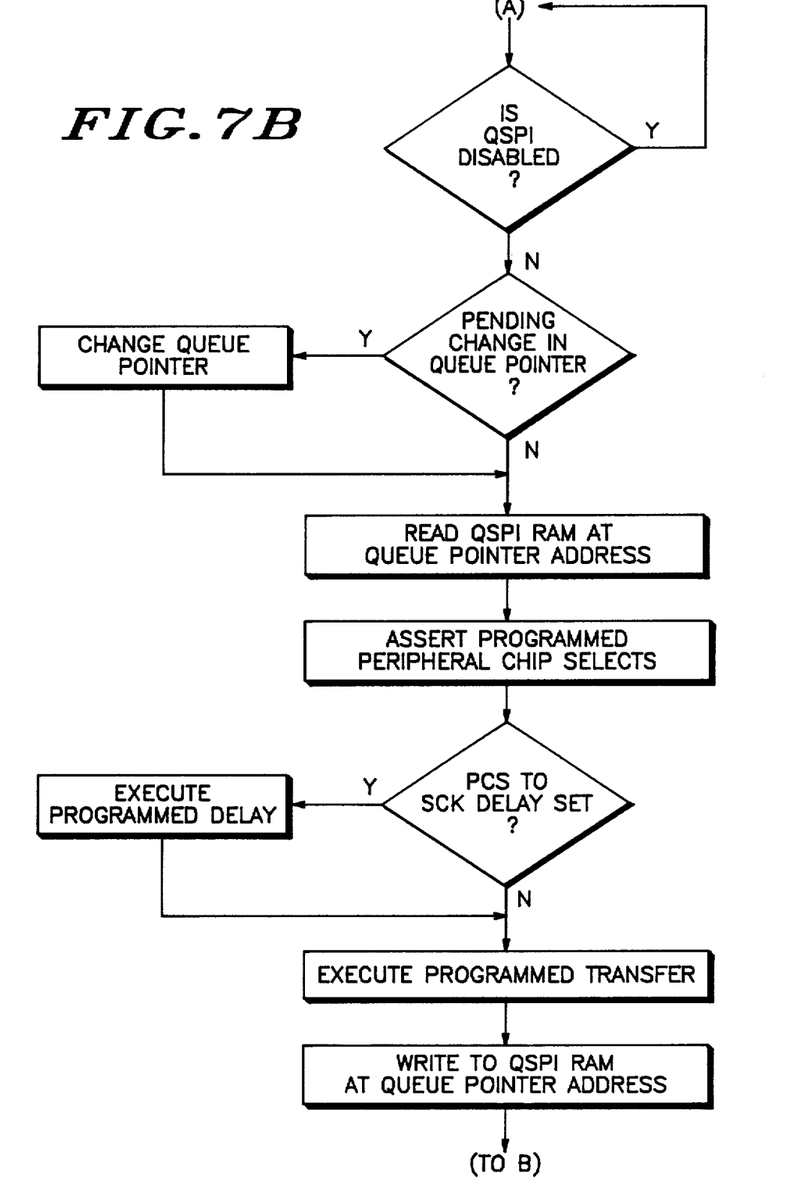
FIG. 7B is a flowchart illustrating a second portion of the operation of the interface of FIG. 3.
Figure 7C:
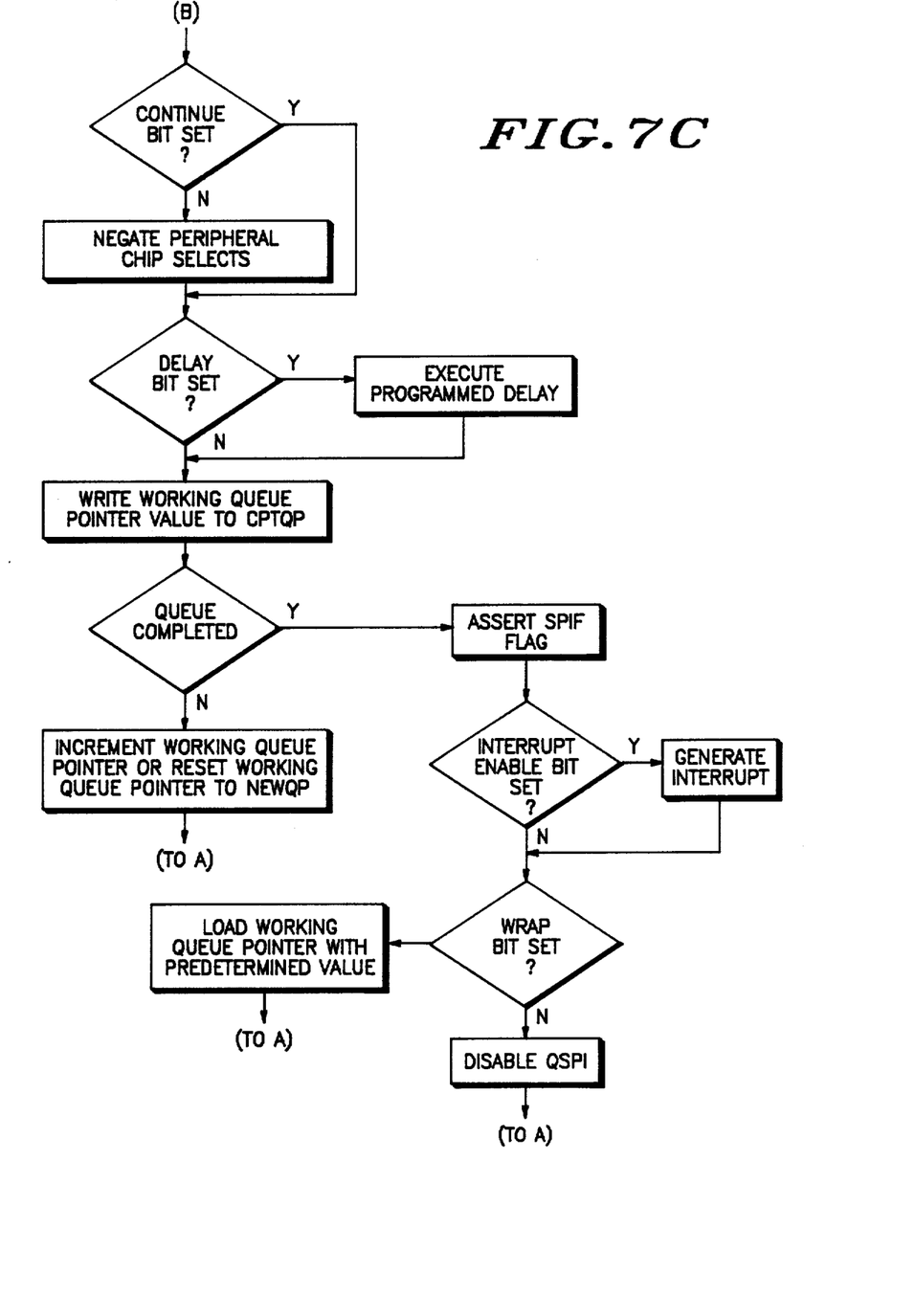
FIG. 7C a flowchart illustrating a third portion of the operation of the interface of FIG. 3.

While most of the functional description of the preferred embodiment of the present invention is contained in the foregoing description of the memory and registers thereof, FIGS. 7A-7C comprise a flow chart which succinctly sets forth the operational nature thereof. Briefly, FIG. 7A illustrates the steps necessary to initialize the QSPI and start the execution of the queued transfers, FIG. 7B illustrates the steps involved in an individual transfer and FIG. 7C illustrates the steps performed after each transfer. As will be apparent from the detailed description of the various control and status register fields, some of the functionality of the present invention is not explicitly described by the flow charts of FIGS. 7A-7C. This is necessary to avoid flow charts so complex as to be incomprehensible.

FIG. 7A illustrates the initialization steps required to prepare the QSPI 20 for use. First, the controlling CPU or other device must write via system bus 21 the transfer commands desired to be executed to the appropriate addresses in QSPI RAM. For each transfer, a byte of Command Control information and the data to be transmitted, if any, must be written. Of course, if previous transfers have left either Command Control bytes and/or data to be transmitted in the QSPI RAM which may be reused, it need not be rewritten. Next, the beginning and end of the queue must be designated. Normally, the beginning of the queue is 0000 and the queue pointer will have been reset to that value after the last executed transfer or reset, so no beginning queue pointer will be required. Otherwise, the desired starting queue pointer is written to NEWQP. Similarly, no ending queue pointer need be designated if ENDQP already contains the appropriate value, either through the action of a reset or a previous write to that location.

Next, the desired values of all the various control parameters must be written to registers SPCR0-SPCR3. Of course, any previously existing values may be reused, if appropriate. In addition, any status flags in SPSR which remain set from a previous operation and which are desired to be cleared must be explicitly cleared by the user. Finally, QSPI is enabled by asserting the enable flag, bit 15 of SPCR1. Execution of the queued transfers will commence immediately and proceed without further intervention from the controlling CPU.

Referring now to FIG. 7B, the steps performed by QSPI 20 in executing each transfer are illustrated. Note that FIG. 7B assumes that QSPI 20 is in the master mode as determined by the MSTR bit of SPCR0. The functional description of the slave mode is a straightforward extension of the principles described below and will not be set forth in detail. First, the SPE flag is checked to see if QSPI 20 is still enabled. If not, no further action is taken. If so, the hidden flag associated with the NEWQP bit field is checked to see if a new queue pointer value has been written therein. If the flag is set, the queue pointer incrementor is loaded with the value of NEWQP. Otherwise, no action is taken.

Next, the Transmit Data and Command Control sections of QSPI RAM are read at the addresses specified by the queue pointer value. Any data in the Transmit Data section is loaded into data serializer 30 and control logic 40 receives the Command Control bits. Next, the peripheral chip select bit field of the Command Control byte is used by control logic 40 to drive the peripheral chip select pins to their programmed values. Next, the DSCK bit of the Command Control byte is examined to determine if a delay has been programmed. If so, the specified delay (DSCKL in SPCR2) is executed. If not, the programmed transfer is executed.

Basically, executing the transfer merely involves driving SCK for a number of cycles determined by the number of bits desired to be transferred. As described above, the number of bits to be transferred is determined by the BITS and BITSE bit fields.

After the predetermined number of bits have been transferred, the received data is moved from data serializer 30 to the Receive Data section of QSPI RAM at the address specified by the queue pointer. This completes the execution of the current transfer.

Referring now to FIG. 7C, the steps performed by QSPI 20 after completing each individual transfer are described. First, the CONT bit in the Command Control byte is examined. If CONT is not asserted, the peripheral chip select pins are driven to their respective inactive states. If CONT is asserted, the chip selects are not negated.

Next, the DT bit in the Command Control byte is examined to determine if a delay after this transfer has been programmed. If DT is asserted, a delay as specified by the value of DTL is executed. Otherwise, no delay is executed.

Next, the value of the working queue pointer is written to CPTQP to indicate that the transfer at this queue pointer location has been executed.

Next, the value of CPTQP is compared to the value of ENDQP to determine whether all of the queued transfers have been completed. If the queue has not been completed, the queue pointer is either incremented or, if a new value has been written to NEWQP, changed to the value of NEWQP.

If the comparison of CPTQP to ENDQP indicates that the queue has been completed, the SPIF flag is asserted. Note that this occurs prior to examination of the WRAP bit. Next, the interrupt enable bit (SPIFIE) is examined to determine whether an interrupt request should be generated. If SPIFIE is asserted, an interrupt request is generated. Otherwise, no interrupt request is generated.

Next, the WRAP bit in SPCR2 is examined to determine whether the wraparound mode is to be entered. If the WRAP bit is asserted, the queue pointer is set to a predetermined value. In the preferred embodiment, the queue pointer is reset to the value of NEWQP, thus providing the ability to wraparound to a point other than the top of the queue. Execution is then returned to a point corresponding to the top of the flow chart of FIG. 7B. If WRAP is found not to be set, then QSPI 20 is disabled by clearing SPE and execution is returned to a point corresponding to the top of the flow chart of FIG. 7B.

Various features and operational modes, such as slave mode, mode fault detect and the like are not shown in the flow charts of FIGS. 7A-7C in order to preserve clarity. However, these minor additions will be apparent to one skilled in the art from the description of the related bit fields in the registers above.

In addition, various modifications and changes to the preferred embodiment described herein will be apparent to one skilled in the art. It is possible, for instance, to design a data serializer 30 and appropriate control mechanisms to provide the ability to output either the most significant or the least significant bit of the data to be transferred first. This would accommodate certain peripherals which expect one or the other convention and relieve the controlling CPU of the necessity of shifting the data to be transferred prior to writing it to QSPI RAM.

Another possible modification to the disclosed embodiment is to, in a sense, make to continuous mode of transfer the default mode rather than the exception and to eliminate the control bit CONT. In this case, the peripheral chip select pins would always be driven immediately to the state determined by the lower four bits of the Command Control byte for the next queued transfer upon the completion of a transfer, without the use of an intervening negated state. If the next queued transfer designated the same peripheral as the destination, of course, this would result in no change in the state of the chip select pins. Thus, continuous transfers to a particular destination would be the natural result of placing more than one transfer with the same programmed destination in adjacent "slots" in a queue. To accommodate peripherals requiring a certain deselected period between transfers, the delay after transfer feature (involving DT and DTL) would be used to impose the requisite delay.

Yet another possible modification to the disclosed embodiment involves a selectable reset value for the queue pointer to be used when a queue has been completed and the wraparound mode is enabled. As mentioned briefly above, logical possibilities for the value to which the queue pointer is to be reset include the value of NEWQP and the top of the queue (0000). It would be possible, for instance, to include a control bit which would specify which of these two values are to be used when a queue is completed and the wraparound mode is enabled.

It is understood in the foregoing description that while the apparatus is described as a serial peripheral interface, it is useful for executing serial data communication between any appropriately equipped devices, whether or not one or more of those devices is a "peripheral" device as that term is used in the art. For instance, the disclosed apparatus could easily execute serial data communications between two MCU's.

The invention disclosed above provides an extremely flexible serial interface for use in data processing systems. In particular, the invention provides for potentially greatly decreased demand on the resources of the controlling CPU while maintaining compatibility with previous SPI peripherals. This is accomplished primarily through the use of a queued interface and autonomous control structure. Further, the programmable transfer lengths, programmable delays, ability to force a change in the queue pointer, ability to perform continuous transfers to a single peripheral and ability to form "subroutines" in the queue make the interface of the present invention extraordinarily flexible.

We claim:

1. A microcomputer comprising a central processing unit and a serial data communication apparatus, the serial data communication apparatus further comprising:
   a first memory coupled to the central processing unit, said first memory having a first predetermined number of storage locations;
   transfer means coupled to said first memory for executing serial data transfers between the serial data communication apparatus and at least one other device coupled thereto, the transfer means further comprising:
   means for retrieving data from said first memory at a first one of said first predetermined number of storage locations;
   means for transmitting said retrieved data to said at least one other device;
   means for receiving data from said at least one other device; and
   means for storing said received data in said first memory at a second one of said first predetermined number of storage locations;
   a second memory coupled to the central processing unit, said second memory having a second predetermined number of storage locations;
   queue pointer means coupled to said first memory means for maintaining a queue pointer value which specifies said first one of said first predetermined number of storage locations; and
   control means coupled to said central processing unit, said transfer means, said first and second memories and said queue pointer means for responding to a first state of an enable bit stored in said second memory at a first one of said second predetermined number of storage locations by directing said transfer means to execute one of said serial data transfers and by incrementing said queue pointer value and for responding to a second state of said enable bit by disabling said transfer means;
   the serial data communication apparatus is characterized in that:
   said control means is further responsive to the central processing unit, while said enable bit is in said first state, to modify said queue pointer value by replacing said queue pointer value with a new queue pointer value provided by the central processing unit instead of incrementing said queue pointer value.

2. A microcomputer according to claim 1 wherein the serial data communication apparatus is further characterized in that:
   said queue pointer value also specifies said second one of said first predetermined number of storage locations.

3. A microcomputer according to claim 1 wherein the serial data communication apparatus further comprises:
   select means coupled to said control means for retrieving data from said first memory at a third one of said first predetermined number of storage locations and for selecting one of said at least one other device in accordance with said retrieved data;
   the serial data communication apparatus is further characterized in that:
   said queue pointer value also specifies said third one of said first predetermined number of storage locations.

4. A microcomputer according to claim 1 wherein the serial data communication apparatus is further characterized in that:
   said control means is further responsive to a first state of a continue bit stored in said first memory at a fourth one of said first predetermined number of storage locations by directing said select means to become inactive while said queue pointer value is being incremented and is responsive to a second state of said continue bit by directing said select means to remain active while said queue pointer value is being incremented; and
   said queue pointer value also specifies said fourth one of said first predetermined number of storage locations.

5. A microcomputer according to claim 1 wherein the serial data communication apparatus is further characterized in that:
   said control means is further responsive to a value of an end queue pointer bit field stored in said second memory at a second one of said second predetermined number of locations by disabling said transfer means.

6. A microcomputer according to claim 5 wherein the serial data communication apparatus is further characterized in that:
   said control means is further responsive to a first state of a wrap bit stored in said second memory at a third one of said second predetermined number of locations by setting said queue point value to a predetermined value instead of disabling said transfer means.

7. A microcomputer comprising a central processing unit and a serial data communication apparatus, the serial data communication apparatus further comprising:
   a first memory coupled to the central processing unit, said first memory having a first predetermined number of storage locations;
   transfer means coupled to said first memory for executing serial data transfers between the serial data communication apparatus and at least one other device coupled thereto, the transfer means further comprising:
   means for retrieving data from said first memory at a first one of said first predetermined number of storage locations;
   means for transmitting said retrieved data to said at least one other device;
   means for receiving data from said at least one other device; and
   means for storing said received data in said first memory at a second one of said first predetermined number of storage locations;

a second memory coupled to the central processing unit, said second memory having a second predetermined number of storage locations;

queue pointer means coupled to said first memory means for maintaining a queue pointer value which specifies said first one of said first predetermined number of storage locations;

control means coupled to said central processing unit, said transfer means, said first and second memories and said queue pointer means for responding to a first state of an enable bit stored in said second memory at a first one of said second predetermined number of storage locations by directing said transfer means to execute one of said serial data transfers and by incrementing said queue pointer value and for responding to a second state of said enable bit by disabling said transfer means; and select means coupled to said control means for retrieving data from said first memory at a third one of said first predetermined number of storage locations and for selecting one of said at least one other device in accordance with said retrieved data;

the serial data communication apparatus is characterized in that:

said queue pointer value also specifies said third one of said first predetermined number of storage locations.

8. A microcomputer according to claim 7 wherein the serial data communication apparatus is further characterized in that:

said control means is further responsive to a first state of a continue bit stored in said first memory at a fourth one of said first predetermined number of storage locations by directing said select means to become inactive while said queue pointer value is being incremented and is responsive to a second state of said continue bit by directing said select means to remain active while said queue pointer value is being incremented; and said queue pointer value also specifies said fourth one of said first predetermined number of storage locations.

9. A microcomputer according to claim 8 wherein the serial data communication apparatus is further characterized in that:

said queue pointer value also specifies said second one of said first predetermined number of storage locations.

10. A microcomputer according to claim 9 wherein the serial data communication apparatus further comprises:

the serial data communication apparatus is further characterized in that:

said control means is further responsive to the central processing unit, while said enable bit is in said first state, to modify said queue pointer value by replacing said queue pointer value with a new queue pointer value provided by the central processing unit instead of incrementing said queue pointer value.

11. A microcomputer according to claim 7 wherein the serial data communication apparatus is further characterized in that:

said control means is further responsive to a value of an end queue pointer bit field stored in said second memory at a second one of said second predetermined number of locations by disabling said transfer means.

12. A microcomputer according to claim 11 wherein the serial data communication apparatus is further characterized in that:

said control means is further responsive to a first state of a wrap bit stored in said second memory at a third one of said second predetermined number of locations by setting said queue pointer value to a predetermined value instead of disabling said transfer means.

13. A microcomputer comprising a central processing unit and a serial data communication apparatus, the serial data communication apparatus further comprising:

a first memory coupled to the central processing unit, said first memory having a first predetermined number of storage locations;

transfer means coupled to said first memory for executing serial data transfers between the serial data communication apparatus and at least one other device coupled thereto, the transfer means further comprising:

means for retrieving data from said first memory at a first one of said first predetermined number of storage locations;

means for transmitting said retrieved data to said at least one other device;

means for receiving data from said at least one other device; and means for storing said received data in said first memory at a second one of said first predetermined number of storage locations;

a second memory coupled to the central processing unit, said second memory having a second predetermined number of storage locations;

queue pointer means coupled to said first memory means for maintaining a queue pointer value which specifies said first one of said first predetermined number of storage locations; and control means coupled to said central processing unit said transfer means, said first and second memories and said queue pointer means for responding to a first state of an enable bit stored in said second memory at a first one of said second predetermined number of storage locations by directing said transfer means to execute one of said serial data transfers and by incrementing said queue pointer value and for responding to a second state of said enable bit by disabling said transfer means;

the serial data communication apparatus is characterized in that:

said control means is further responsive to a value of an end queue pointer bit field stored in said second memory at a second one of said second predetermined number of locations by disabling said transfer means.

14. A microcomputer according to claim 13 wherein the serial data communication apparatus is further characterized in that:

said control means is further responsive to a first state of a wrap bit stored in said second memory at a third one of said second predetermined number of locations by setting said queue pointer value to a predetermined value instead of disabling said transfer means.

15. A microcomputer according to claim 14 wherein the serial data communication apparatus is further characterized in that:

said queue pointer value also specifies said second one of said first predetermined number of storage locations.

16. A microcomputer according to claim 15 wherein the serial data communication apparatus further comprises:
- select means coupled to said control means for retrieving data from said first memory at a third one of said first predetermined number of storage locations and for selecting one of said at least one other device in accordance with said retrieved data;
- the serial data communication apparatus is further characterized in that:
- said queue pointer value also specifies said third one of said first predetermined number of storage locations.

17. A microcomputer according to claim 16 wherein the serial data communication apparatus is further characterized in that:
- said control means is further responsive to a first state of a continue bit stored in said first memory at a fourth one of said first predetermined number of storage locations by directing said select means to become inactive while said queue pointer value is being incremented and is responsive to a second state of said continue bit by directing said select means to remain active while said queue pointer value is being incremented; and
- said queue pointer value also specifies said fourth one of said first predetermined number of storage locations.

18. A microcomputer according to claim 17 wherein the serial data communication apparatus is further characterized in that:
- said control means is further responsive to the central processing unit, while said enable bit is in said first state, to modify said queue pointer value by replacing said queue pointer value with a new queue pointer value provided by the central processing unit instead of incrementing said queue pointer value.

* * * * *